United States Patent [19]

Grabowski

[11] 4,181,395
[45] Jan. 1, 1980

[54] CONNECTOR FOR ELECTRICAL COMPONENTS TO BE INSTALLED IN FLUSH RECEPTACLE BOXES

[76] Inventor: Walter Grabowski, In der Wüste 14, 5960 Olpe-Biggesee, Fed. Rep. of Germany

[21] Appl. No.: 880,881

[22] Filed: Feb. 24, 1978

[30] Foreign Application Priority Data

Feb. 28, 1977 [DE] Fed. Rep. of Germany ....... 2708566

[51] Int. Cl.² ............................................. H02G 3/12
[52] U.S. Cl. ........................... 339/176 MF; 174/72 R
[58] Field of Search ............... 339/17 F, 176 MF, 37, 339/38; 174/71 R, 72 R

[56] References Cited

U.S. PATENT DOCUMENTS

| | | | |
|---|---|---|---|
| 3,182,280 | 5/1965 | Daut et al. | 339/38 |
| 3,189,863 | 6/1965 | Leach | 339/17 F |
| 3,416,123 | 12/1968 | Husebo | 339/37 |

FOREIGN PATENT DOCUMENTS 1114461  5/1968  United Kingdom .................. 339/17 F

*Primary Examiner*—Neil Abrams
*Attorney, Agent, or Firm*—Max Fogiel

[57] ABSTRACT

A connector for a plurality of electrical devices, particularly switches and receptacles, to be installed adjacently or on top of one another in flush receptacle boxes. An insulated flat conductor has a required number of wires for at least two independently actuated installation devices. The flat conductor is connectable to a power supply line and to connecting lines. Contact blades are placed at predetermined intervals, required for the installation devices, on the wires. Tapping points are formed by the contact blades and are backed up by a support for the flush receptacle boxes and projecting beyond the flat conductor. The flush receptacle boxes are provided with a cut-out bottom area. The contact blades, moreover, have an easily detached insulation, and the wires have terminals for connecting to a power supply line and a connecting line. The support may be tub-shaped, and the wires may be fused in the support which may extend over the length of the connector.

1 Claim, 3 Drawing Figures

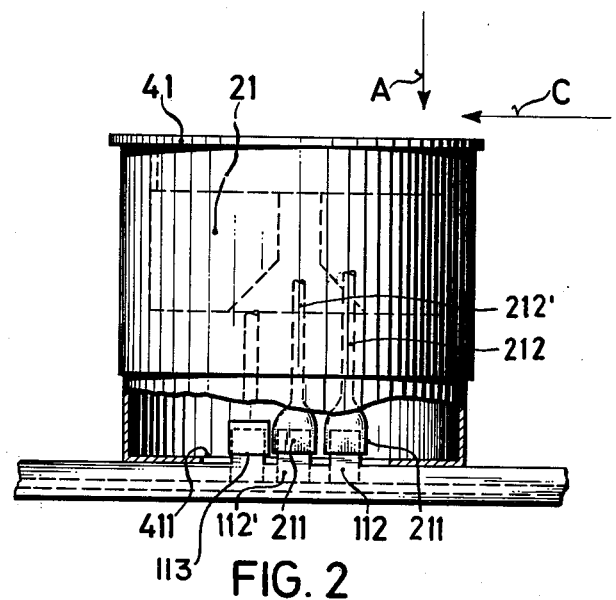
FIG. 2
FIG. 3
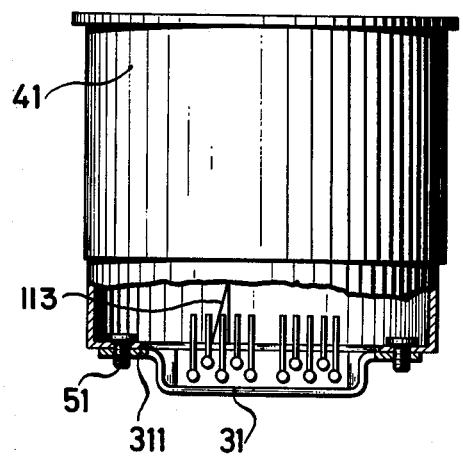

CONNECTOR FOR ELECTRICAL COMPONENTS TO BE INSTALLED IN FLUSH RECEPTACLE BOXES

BACKGROUND OF THE INVENTION

The present invention relates to a connector for a plurality of electrical devices, particularly switches and wall receptacles, to be installed adjacent to one another or on top of one another in flush receptacle boxes.

With the majority of electrical devices to be installed adjacent to one another or on top of one another in flush receptacle boxes, the wires for the devices to be installed in subsequent receptables are laid through the receptacles ahead of them. This is, on the one hand, very cumbersome, and on the other hand the expansion possibilities are limited.

It is, therefore, an object of the present invention to provide a connector of the above-described type which can be manufactured simply and quickly and can be expanded in case of need.

Another object of the present invention is to provide a connector of the foregoing character which is simple in construction and may be economically fabricated.

A further object of the present invention is to provide a connector, as described, which may be readily maintained in service and which has a substantially long operating life.

SUMMARY OF THE INVENTION

The objects of the present invention are achieved by providing an insulated flat conductor which has the required wires for at least two independently operated electrical devices with contact blades placed on the lines at an interval required for such installation devices; the tapping points formed by the contact blades are backed up by supports, protruding beyond the flat conductor, for the flush receptacles, with cutout bottom area.

The connector in accordance with the present invention is connected to the power line and the available wires, provided with flush receptacle boxes. The flush receptacle boxes are provided with electrical devices as required, with the connection of the devices being accomplished very simply by inserting plugs on the contact blades involved. The number of devices placed next to or on top of one another is no longer limited by the capacity of the flush receptacle boxes.

The contact blades are conveniently provided with easily detached insulators, which may be caps placed on the contact blades. These caps may be reusable.

In a further embodiment of the present invention, the wires of the connector are provided with terminals for connecting the power supply line and the associated connecting lines. The wires can be fused directly or indirectly with a suppport extending over the length of the connector.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows the view of the connector viewed in the direction of arrow B in FIG. 1; and FIG. 3 shows the view of the connector viewed in the direction of arrow C in FIG. 2.

DESCRIPTION OF THE PREFERRED EMBODIMENT

Figure 1:
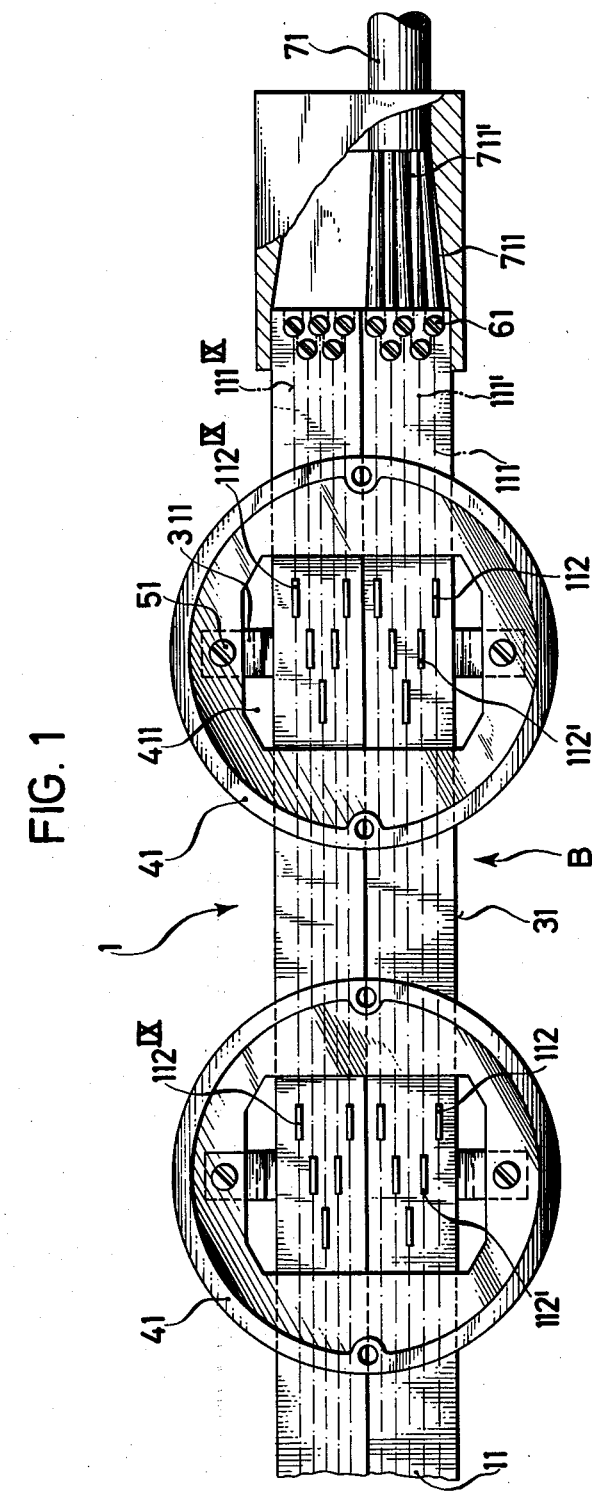
FIG. 1 shows the view of the connector in accordance with the present invention when viewed in the direction of arrow A in FIG. 2.

The connector 1 comprises a flat conductor 11 with ten wires 111, 111' . . . 111$^{IX}$. At a distance (spacing) required by the installability of electrical devices adjacently or on top of one another, the wires 111, 111' . . . 111$^{IX}$ have contact blades 112, 112' . . . 112$^{IX}$ on which cap-shaped plugs 211, 211' can be placed individually. These plugs can be connected to a device 21, via cables 212, 212' to be clipped to electrical installation devices. The contact blades may have easily detachable insulation 113.

The cap-shaped plugs 211, 211' are the plugs which can be mounted on the contact blades 112, 112' and are part of the cables 212, 212' leading to the device 21. The plugs 211, 211' are indirectly part of the device 21 via the cables or conductors 212, 212'.

The flat conductor 11 is supported by tub-shaped supports 31 whose rim portions 311 projecting in the vicinity of the installation facilities beyond the flat conductor 11, have threaded holes 312 for screws 51 for fastening the flush receptacle boxes 41 holding the electrical device 21 with cutout bottom area 411 for passage of contact blades 112, 112' . . . 112$^{IX}$.

On at least one end, the wires 111, 111' . . . 111$^{IX}$ constituting the flat conductor 11 have terminals 61 for connecting the wires 711, 711' of power supply line 71 and the connected lines (71).

The connector 1 is laid together with the attached flush receptacle boxes 41 inside the wall. The flush receptacle boxes 41 are provided, as required, with installation devices 21 such as switches and receptacles. The devices 21 are connected individually to the associated contact blades 112, 112' . . . 112$^{IX}$ by plugging in the associated plugs 211, 211' on the contact blades 112, 112' . . . 112$^{IX}$ so that they can be serviced or used independently from one another.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. A connector for a plurality of electrical devices, particularly switches and receptacles, to be installed adjacently or on top of one another in flush-mounted receptacle boxes, comprising: an insulated flat conductor having wires for at least two independently actuated installation devices; said flat conductor being connectable to a power supply line and to connecting lines; contact blades associated with the wires and placed at predetermined intervals on said wires; a support for flush-mounted receptacle boxes, said flush-mounted receptacle boxes having a cut-out bottom area; said blades forming tapping points backed up by said support; said support projecting beyond said flat conductor; wires being selectively connectable by plug elements assigned to associated contact blades; said contact blades being free of insulation therebetween; said contact blades being fixed and connected to the wires of said flat conductor, said contact blades having an easily detachable insulation, said wires having terminals for connecting to a power supply line and a connecting line, said support being tub-shaped, said wires being embedded in said flat conductor backed by said support, said support extending over the length of said connector, said plug elements being cap-shaped and placed individually on said contact blades, said plug elements being connectable to said devices by cables to be clipped to said device, said tub-shaped support having rim means projecting in the vicinity of said devices beyond said flat conductor with threaded holes for screws to fasten said flush receptable boxes with cutout bottom area for passage of said contact blades, said connector being installed together with attached flush receptacles inside a wall, said devices being connectable individually to associated contact blades by plugging associated plug elements on the contact blades to that they are independently serviceable.

* * * * *